United States Patent [19]

Sonoda et al.

[11] 4,236,077

[45] Nov. 25, 1980

[54] IMAGE INTENSIFIER

[75] Inventors: Tomiya Sonoda, Machida; Hiroshi Washida, Kawasaki, both of Japan

[73] Assignee: Tokyo Shibaura Denki Kabushiki Kaisha, Kawasaki, Japan

[21] Appl. No.: 936,392

[22] Filed: Aug. 24, 1978

[30] Foreign Application Priority Data

Aug. 29, 1977 [JP] Japan ................................ 52-102571

[51] Int. Cl.[2] ............................ G01T 1/20; G01J 1/58

[52] U.S. Cl. ................................ 250/361 R; 250/367; 250/486

[58] Field of Search ........... 250/483, 487, 486, 361 R, 250/213 VT, 367; 427/64, 65, 68

[56] References Cited

U.S. PATENT DOCUMENTS

| | | | |
|---|---|---|---|
| 3,041,456 | 6/1962 | MacLeod | 250/486 |
| 3,825,763 | 7/1974 | Ligtenberg et al. | 250/486 |
| 4,011,454 | 3/1977 | Lubowski et al. | 250/486 |

FOREIGN PATENT DOCUMENTS 52-136560 11/1977 Japan .

OTHER PUBLICATIONS

A. Stevels et al., "Vapor-Deposited CsI:Na Layers, II. Screens for Application in X-ray Imaging Devices," Philips Res. Rpts., vol. 29, 1974, pp. 353-362.

*Primary Examiner*—Alfred E. Smith
*Assistant Examiner*—Carolyn E. Fields
*Attorney, Agent, or Firm*—Cushman, Darby & Cushman

[57] ABSTRACT

An input screen of an image intensifier comprises an aluminum substrate with electrochemically deposited netty protrusions, a phosphor layer formed on the substrate and including a large number of columnar blocks defined by cracks extending from the tops of the netty protrusions toward the surface of the layer, and a photocathode deposited on the phosphor layer directly or through a protective layer.

14 Claims, 10 Drawing Figures

IMAGE INTENSIFIER

BACKGROUND OF THE INVENTION

1. Field of the Invention

This invention relates to an image intensifier comprising an input screen converting a radiation image such as an X-ray, γ-ray or weak light image into an electron image, and an output screen converting the electron image into a visible light image.

2. Brief Description of the Prior Art

An image intensifier converting a radiation such as an image of X-rays, γ-rays or feeble light into a bright visible light image typically comprises an input screen converting the radiation image into a photoelectron image and on output screen converting the photoelectron image into a visible light image.

It is desirable that the visible light image have high resolution which depends mainly upon the converting fidelity of the input screen.

The input screen has a substrate usually made of aluminum which effectively transmits such radiation. On the substrate, an alkali halide phosphor layer is formed by vacuum deposition which is effectively luminesced by the radiation. Further, on the phosphor layer a photocathode, for example cesium antimonide (Sb-Cs), is deposited which is sensitive to the luminescence of the phosphor.

Hitherto, to improve the resolution of the input screen, a cracked phosphor screen having a plurality of phosphor blocks (a bundle of columnar crystals) separated from each other by cracks has been employed as taught by U.S. Pat. No. 3,825,763. In this screen the light generated in a phosphor block is mostly scattered only within the same block by total reflection and cannot travel to other blocks. Namely each block (not columnar crystal) has a light guiding effect. Such phosphor screen can be prepared by depositing a phosphor material such as cesium iodide on an aluminum substrate and thereafter heating them to generate cracks in the deposited phosphor layer by means of a difference of thermal expansion coefficients between the substrate and the phosphor.

However this input screen has following drawbacks: (1) Cracks, generated by strain caused by the temperature differential between the substrate and the surface of the phosphor layer, are liable to be generated from the upper surface of the phosphor layer. Consequently it is difficult for the cracks to reach near the substrate. The light guiding effect of the phosphor layer is insufficient (because the phosphor blocks formed by the cracks generated from the substrate side are few). Resolution of the X-ray image intensifier having such input screen is therefore 28∼30 1 p/cm.

(2) If the cracks are generated by heat treatment of the screen, it is difficult to obtain a stable input screen.

Another method for making a cracked phosphor layer comprises the steps of impressing a metallic gauze (e.g. copper gauze) upon an aluminum substrate and depositing cesium iodide on the impressed substrate. Such a method is taught by U.S. Pat. No. 3,825,763. However it is difficult to impress the metallic gauze upon the substrate without generating any folds because the substrate is usually of domed shape.

In U.S. patent application Ser. No. 794,025, two of the present inventors offered an image intensifier having an input screen comprising a substrate whose surface is covered with mosaic or tile structure divided by a plurality of fine grooves, a phosphor layer of block structure deposited on the substrate and a photocathode layer formed on the phosphor layer.

However, an image intensifier which has higher resolution and can be provided much more reproducibly results from the present invention.

SUMMARY OF THE INVENTION

Accordingly an object of the present invention is to provide an image intensifier having a remarkably improved resolution.

Another object is to provide an image intensifier comprising an input screen being adherent strongly between a phosphor layer and a substrate.

Another object is to provide an image intensifier comprising an input screen having a high brightness.

A further object is to provide an image intensifier with reproducible characteristics.

An image intensifier according to the present invention has an input screen comprising a substrate on one surface of which a plurality of netty protrusions are formed electrochemically, a phosphor layer being in the state of a plurality of columnar blocks on the substrate, and a photocathode formed directly on the phosphor layer or indirectly on the phosphor layer through a protective layer. Each columnar block is divided by cracks extending from the tops of the electrochemically formed netty protrusions. The netty protrusions, which are higher than some microns, can generate the cracks in the phosphor layer. In such an input screen luminous light excited by radiation in a phosphor block substantially does not traverse to adjacent blocks by total reflection at the boundary of the blocks but reaches the photocathode on the same block and emits photoelectrons from the photocathode. When the height of the netty protrusions is more than a fifth of the thickness of the phosphor layer and a quarter of the average diameter of the phosphor blocks, the luminous light is effectively intercepted to spread transversely. In this case the netty protrusions operate as interceptive walls for light. Using this input screen, an image intensifier having high resolution can be obtained. The interceptive walls for light are preferred not to protrude from the surface level of the phosphor layer.

Use of a reflective layer deposited on such a substrate results in an improvement of brightness of the image intensifier. The reflective layer makes the excited light directing to the substrate return from the substrate toward the photocathode and covers some impurities on the substrate to prevent the phosphor layer from reacting therewith.

According to this present invention, it is a distinguished feature that the netty protrusions are deposited reproducibly by an electrochemical method only in the fine grooves dividing the mosaics formed previously on the electrically conductive substrate followed by a step of removing the mosaics by some etching method. The layer of the mosaics is named "auxiliary layer."

A similar structure is favorable for an output screen of an image intensifier.

DETAILED DESCRIPTION OF PREFERRED EMBODIMENTS

There will now be described by reference to the accompanying drawings an image intensifier according to some embodiments of this invention.

Figure 1:
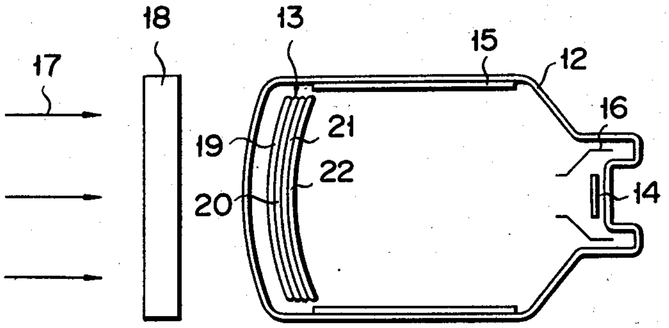
FIG. 1 is a cross-sectional view of an image intensifier embodying this invention.
Figure 2:
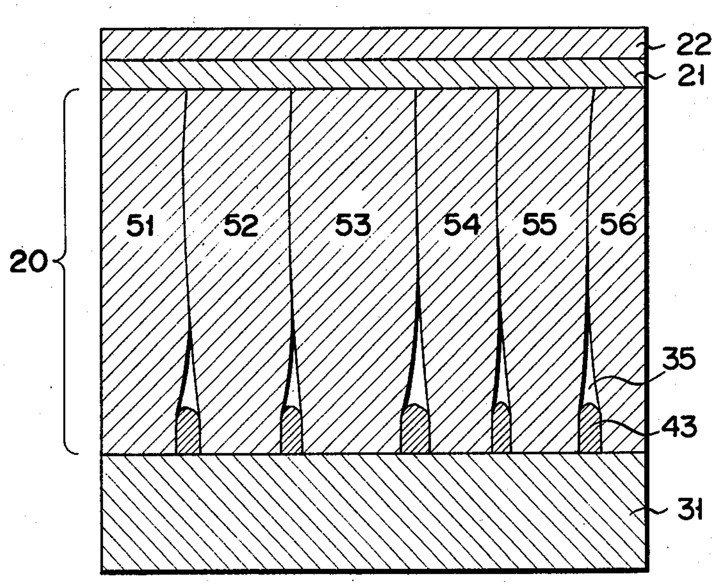
FIG. 2 is an enlarged cross-sectional view of a part of an input screen for an image intensifier according to one embodiment of this invention.

Referring to FIG. 1 schematically showing the whole of an X-ray image intensifier, a glass envelope 12 contains an input screen 13 so shaped as to conform to the convex front end face of the glass envelope 12 and an output screen 14 lying near the rear end face of the glass envelope 12. Provided by the conventional process between the input screen 13 and output screen 14 are a focussing electrode 15 and acceleration electrode 16 respectively to focus electron beams from the input screen 13 and accelerate said electron beams. The input screen 13 comprises a substrate 19 formed of an aluminum layer permeable to X-rays; a phosphor layer 20 formed on the inner surface of the substrate 19 and excited by X-rays passing through the substrate to emit visible light; a protective layer 21 formed on the phosphor layer 20 of a material chemically stable and permeable to light excited in the phosphor layer 20; and a photocathode 22 deposited on the protective layer 21. Referring to FIG. 1, reference numeral 17 denotes X-rays and 18 shows an object exposed to X-rays.

Now there will be described the detailed construction of a phosphor layer of an image intensifier according to the present invention together with the method of manufacturing the same with reference to FIGS. 2–5. An auxiliary layer 33 comprising electrically insulating fine mosaics 32 is formed on at least one surface of an electrically conductive substrate 31, for example an aluminum sheet about 0.5 mm thickness. Only the surfaces of the mosaics 32 need be electrically insulated. After that, dividing members 43 such as metal are deposited electrochemically only in grooves 37 dividing the fine mosaics 32, and then the auxiliary layer 33 is removed by etching method. Consequently the dividing members change into netty protrusions. On such a substrate a phosphor layer 20 is deposited and then block structure can be made by the cracks 35 extending from the tops of the netty protrusions toward the surface of the phosphor layer.

The auxiliary layer 33 on the substrate surface is formed by means of anodization of an aluminum sheet, followed by sealing process and heat treatment. The surface of the mosaics must be electrically insulated. The auxiliary layer 33 may be composed of another material, for example an organic thin film cracked by heat treatment. The dividing members 43 can be deposited easily in the grooves 37 by an electrochemical method, because the bottoms 36 of the groove are electro-conductive through the substrate. If the bottoms of the grooves are covered with electrically insulating films, these are preferred to be removed by some etching method before the deposition of dividing members.

The present invention will be minutely described in the following examples.

EXAMPLE 1

Figure 3:
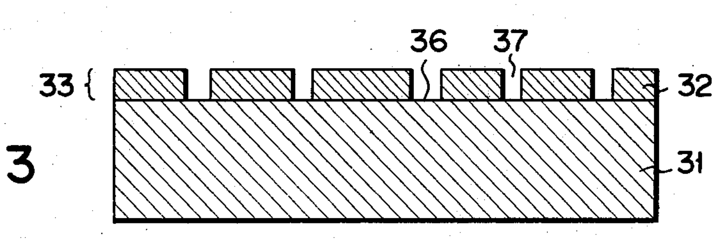
FIGS. 3, 4 and 5 are enlarged sectional views of the fabricational steps of the input screen of FIG. 2.

One side of an aluminum sheet 0.5 micron thick 31 was subjected to anodizing and then sealing process of minute pores formed therein and heat treatment, thereby causing the treated side of the aluminum sheet to present an auxiliary layer 33 formed of a plurality of mosaics 32 irregularly defined by narrow groove 37. That is, the aluminum sheet was subjected to anodizing for about one hour in a 3% oxalic acid solution by introducing current of 1 A/dm$^2$, thereby rendering the surface of the aluminum sheet oxidized and porous. Thereafter, the aluminum sheet was washed with water and then dipped in boiling water for about one hour for the swelling of water of crystallization contained in the numerous pores, that is, underwent the so-called sealing process. The oxidized aluminum sheet containing water of crystallization was thermally treated for more than several minutes at a higher temperature than about 250° C. to evaporate the water of crystallization from the surfaces. As a result, the aluminum sheet forming the substrate 31 presented a mosaic surface. As microscopically measured, the mosaic surface of the substrate 31 included narrow grooves 37 having a width of about 3 to 7 microns and a depth of about 10 microns. Most of mosaics 32 had an average diameter of 50 to 100 microns (FIG. 3).

Figure 4:
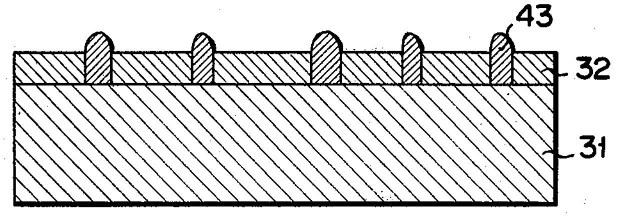
Figure 5:
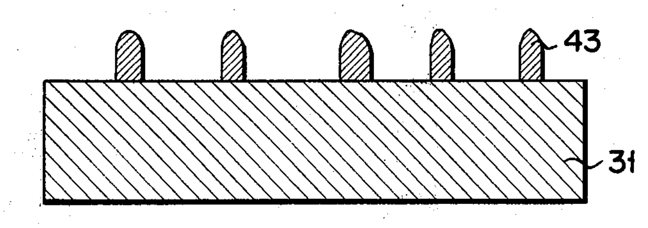

Thereafter, nickel metal was electrochemically plated on the substrate treated as mentioned above. Nickel metal was deposited preferentially in the narrow grooves whose bottoms were electrically conductive to the substrate 31. (FIG. 4). The description of the method of electrochemical plating of nickel is omitted because it is well known in the field of electrochemical engineering. Thereafter, the mosaics 32 of aluminum oxide were removed by etching in aqueous caustic soda solution. Then the dividing members 43 changed into netty protrusions of about 10$\mu$ in height. (FIG. 5).

Next, a phosphor layer 20 was formed in such a manner that cesium iodide is thermally deposited in vacuum with a thickness of about 150 microns on the above mentioned surface of the substrate 31 maintained at about 80° C. The phosphor layer 20 includes a large number of columnar blocks 51~56 about 50 to 100 microns in diameter which are defined by cracks 35 formed above the tops of the netty protrusions 43 and arranged parallel to one another on the surface of the substrate 31.

On such a phosphor layer, a protective layer 21 of aluminum oxide was deposited by about 500 Å in thickness and a photocathode layer 22 was formed on the protective layer 21. When an image intensifier was fabricated using such an input screen, high resolution and strong adhesion between the phosphor layer and the substrate was achieved. And it was a most remarkable result to form the block structure of phosphor layer much reproducibly.

EXAMPLE 2

In the example 1, the thin oxide films covering the bottoms of narrow groove were etched and removed before the step of electrochemical plating of nickel. Then the netty protrusions were deposited very smoothly and adhered strongly to the substrate.

EXAMPLE 3

The material for electrochemical plating in the narrow grooves were selected, from gold, copper, chromium and other metals. Electrically non-conductive materials could also be deposited by electrophoretic method. The results of using these materials were similar to the example 1.

EXAMPLE 4

Figure 6:
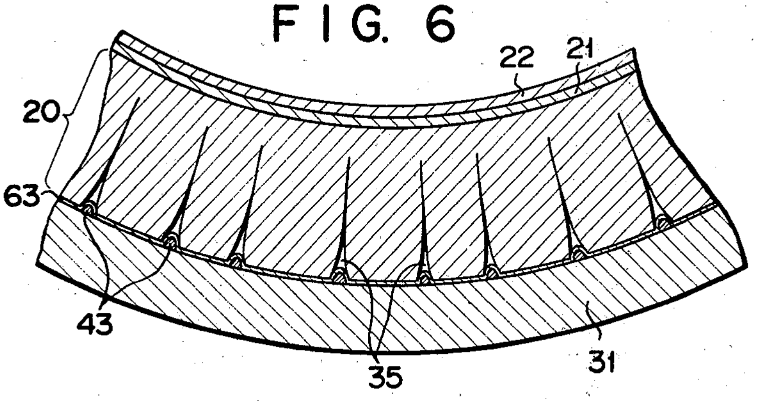
FIG. 6 is an enlarged cross-sectional view of a part of an input screen for an image intensifier according to another embodiment of this invention.
Figure 7:
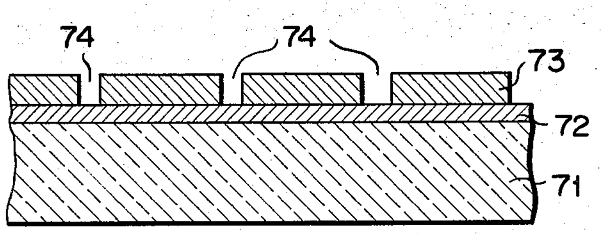
FIGS. 7, 8, 9 and 10 are enlarged sectional views of the fabricational steps of an output screen for an image intensifier according to further embodiments of this invention.
Figure 8:
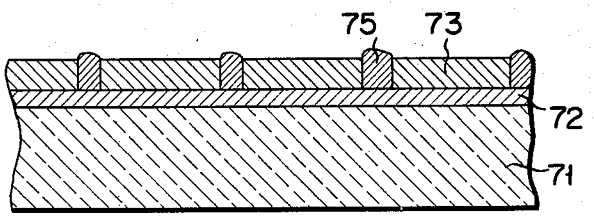
Figure 9:
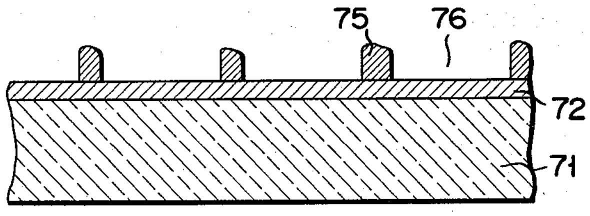
Figure 10:
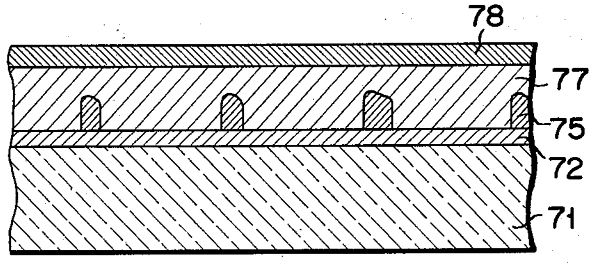

Substantially the same procedures as in Example 1 were followed except that after formation of dividing member 43 a reflective layer 63 of aluminum as shown in FIG. 6 was formed in a thickness of 2000 Å on the dividing members 43 and the substrate 31. In the resultant input screen, the X-ray passing through the substrate 31 and the reflective layer 63 serves to excite the phosphor layer 20 so as to generate a visible light. Part of the visible light is reflected by the reflective layer 63 to reach the photocathode layer 22. As a result, the image intensifier having the above-noted input screen incorporated therein exhibited a brightness about 20 to 25% higher than in Example 1.

Of course the reflective layer was also applied in other examples and showed similar effect.

EXAMPLE 5

On one side of an aluminum sheet 0.5 mm thick, chromium was plated electrochemically as an auxiliary layer under the following conditions. That is, the aluminum sheet was subject to electrochemical plating of chromium in the plating bath comprising chromium oxide 200~500 g/l and sulphuric acid 0.5~2 g/l under the temperature 30°~70° C. and introducing current of 10~50 A/dm$^2$. The thickness of the plated chromium was ten microns. The formed chromium layer had fine grooves. After sufficient washing, said substrate was subject to heat treatment in an oxidizing atmosphere. Then a plurality of mosaics were formed in the auxiliary layer by growing of the fine grooves and the surfaces of the mosaics were covered with oxide films which is electrically non-conductive. The average size of mosaics was 20~50$\mu$. The thickness was about 10$\mu$ and the width of the narrow grooves was about 1~2$\mu$. Then after the oxide films on the bottoms of the narrow grooves were removed by chemical etching, the electrochemical plating of gold was taken into the grooves. Gold plating was deposited preferentially in the grooves and resulted in dividing members. The height of the dividing members was nearly equal to that of the auxiliary layer. Next, the auxiliary layer was etched electrochemically in the bath of the mixture of phosphoric acid 500~1,000 cc/l and triethanol amine 100~500 cc/l at the temperature of 65°~95° C., by introducing electric current. Then the dividing members remained as netty protrusions of about 10$\mu$ height and the average pitch of the netty protrusions was about 20~50$\mu$. And then a phosphor layer of cesium iodide was deposited on the substrate under the conditions as mentioned in example 1.

An image intensifier using the above mentioned input screen showed 43 lp/cm in resolution.

EXAMPLE 6

Nickel on manganese was deposited electrochemically for auxiliary layer in place of chromium used in example 5. The characteristics of the image intensifier embodying this example were same as the example 4.

EXAMPLE 7

In the example 5, zirconium was deposited before chromium deposition. In this case chromium deposition was very easily and smoothly performed.

EXAMPLE 8

After the surface of the aluminum sheet of about 0.5 mm thickness was subject to removal of grease and cleaning by etching, molybdenum oxide was deposited as an auxiliary layer by electrophoretic method on one side of the sheet under the following conditions. That is, the electrophoretic deposition was undergone in the bath of the mixture of molybdenum oxide ammonium 5~30 g/l and sodium nitrate 10~30 g/l. Molybdenum oxide was deposited in 2$\mu$ thick. Then an auxiliary layer was formed in black color and composed of a plurality of mosaics divided by fine cracks. Further the substrate was washed in flowing water and subject to heat treatment of 100°~500° C. Then the fine grooves grew and the width thereof became up to 1~2$\mu$. Gold was deposited in the grooves by electrochemical plating method, and thereafter the auxiliary layer of molybdenum oxide was removed by nitric acid. Consequently netty protrusions were formed on the aluminum substrate. A phosphor layer, a protective layer, and a photocathode were formed successively and thus an input screen of an image intensifier was accomplished. This showed characteristics as mentioned in example 1.

EXAMPLE 9

On the concave surface of an aluminum substrate 31 having a certain curvature, was poured an epoxy mixed resin comprising epoxy resin, benzoyl peroxide as a hardening reagent and dimethyl aniline as an auxiliary reagent. (FIG. 6). The mixing rate of these was 100:0.5~4:0.5~3. The mixed resin was spread on the substrate 31 in about 10$\mu$ thick by rotating the substrate. The substrate with such resin layer was heated quickly to 100°~250° C., then the condensation reaction of the resin layer took place, and mosaic structure was formed as an auxiliary layer. Thereafter, a metal such as gold, nickel or copper was electrochemically plated on the substrate having a plurality of narrow grooves dividing the mosaics of epoxy resin. After that, the auxiliary layer was removed by acetone and the netty protrusions 43 revealed itself on the substrate. To complete the removal of the resin a heat treatment in air was added. On such substrate reflective layer 63 of aluminum was deposited by 0.3~1$\mu$ in thickness. Next, cesium iodide phosphor 20 was deposited by about 150$\mu$ in thickness, then cracks 35 extended in corresponding to the tops of the netty protrusions in the phosphor layer 20 and block structure was formed. Each block is preferred to connect together near the surface. As a result, the photocathode 22 can be formed smoothly on a protective layer 21 covering the phosphor layer 20. This was achieved in this example.

An image intensifier using an input screen of this embodiment showed the improvement of the value of modulation by about 50%, and the increase of brightness by about 20%, which was thought to be caused by the elevation of reflection and the prevention of reaction between the phosphor and the impurities on the substrate. According to this example image intensifiers having such improved characteristics could be fabricated reproducibly.

EXAMPLE 10

In the example 8, the auxiliary layer 100μ thick was applied by repeating of application and heat treatment. Repeating was preferred to make a fine mosaic structure in the case of a thick auxiliary layer. The height of the netty protrusions was about 100μ and the average size of the phosphor blocks was about 50~100μ. The phosphor layer was deposited up to 150μ in thickness. As the result of high netty protrusions, they intercepted completely the excited light to diffuse transversely. That is, they operated as interceptive wall for light.

An image intensifier using such phosphor layer showed very high resolution of about 43 lp/cm.

EXAMPLE 11

Adding to the example 9, repeating application of resin, heat treatment and electrochemical deposition in narrow grooves, and finally removing the resin were more preferred.

EXAMPLE 12

This is an embodiment of the present invention which is applied to an output screen of an image intensifier. There will now be described the detailed construction and the method of manufacturing the output screen according to this invention with reference to FIGS. 7 to 10.

On one side of the transparent glass 71 transparent electroconductive layer 72 of 1,000~2,000 Å in thickness, for example indium oxide, was deposited and on the electroconductive layer 72 such as aluminum film of 3μ in thickness was deposited by vacuum evaporation method. Said aluminum film was subject to anodizing in oxalic acid solution and changed into aluminum oxide film 73. Said aluminum oxide film was successively subject to sealing process and heat treatment. As the result of these successive processes, fine grooves 74 were formed in the aluminum oxide film 73. Thereafter similarly to the example 1 metal for example nickel was electrochemically deposited in the grooves 74 and the mosaics of aluminum oxide film was removed by etching. Then the interceptive walls 75 of nickel and a plurality of fine rooms 76 surrounded by the interceptive walls 75 remained. The height of the interceptive walls was about 4μ.

In the above mentioned glass substrate, phosphor layer comprising phosphor particles of zinc sulfide and a small quantity of water glass as binder was deposited by 7μ in thickness by means of sedimentation method. This phosphor layer 77 was covered with aluminum film back 78 and was settled in an image intensifier.

The output screen according to this example showed a 15% of improvement on MTF at 40 lp/mm relative to the conventional one. MTF stands for Modulated Transfer Function which is related to resolving power.

EXAMPLE 13

In the example 12, the phosphor layer was deposited by means of evaporation method (maybe vacuum deposition) in place of sedimentation. The material of phosphor was zinc sulfide containing a little of chlorine and copper. The brightness of this output screen was only one-third of conventional type using phosphor particles but the resolution was improved by 30% on MTF at 40 lp/mm. As additional description, the brightness was about two times as large as a conventionally evaporated phosphor screen.

Further, the phosphor layer of this example was used as an output screen of an image intensifier for observing a dark scene, which comprises a photocathode and an output phosphor screen. The improvement of the characteristics was achieved similarly as expected from the above mentioned characteristics.

What we claim is:

1. An image intensifier comprising an input screen converting a radiation image into an electron image;

an electro-optical system accelerating and focusing the electron image and an output screen converting the accelerated and focused electron image into a visible light image, wherein at least one of the input screen and the output screen comprises;

a substrate;

a plurality of electrochemically deposited netty protrusions on at least one surface of the substrate and a phosphor layer formed on the substrate having cracks extending from the tops of the netty protrusions toward the surface of the phosphor layer and a plurality of columnar blocks defined by the cracks.

2. An image intensifier according to claim 1, wherein the substrate is of electrically conductive material.

3. An image intensifier according to claim 1, wherein the substrate of the input screen is of aluminum.

4. An image intensifier according to claim 1, wherein the substrate of the output screen is of glass having an transparent and electrically conductive surface.

5. An image intensifier according to claim 1, 2, 3 or 4, wherein the electrochemically deposited netty protrusions are of metal.

6. An image intensifier according to claim 1, 2, 3 or 4, wherein the electrochemically deposited netty protrusions are of a material selected from nickel, gold, copper and chromium.

7. An image intensifier according to claim 1, 2, 3 or 4, wherein the electrochemically deposited netty protrusions are interceptive walls for luminous light.

8. An image intensifier according to claim 7, wherein the height of the interceptive walls is nearly equal to or higher than one fifth of the thickness of the phosphor layer and a quarter of the average size of the phosphor blocks.

9. An image intensifier according to claim 1, wherein a reflective layer is interposed between the substrate and the phosphor layer.

10. An image intensifier according to claim 9, wherein the reflective layer is of aluminum.

11. An image intensifier according to claim 1, wherein the phosphor layer of the input screen is of alkali halide.

12. An image intensifier according to claim 11, wherein the phosphor layer is of cesium iodide.

13. An image intensifier according to claim 1, wherein the phosphor layer of the output screen is of zinc sulfide.

14. An image intensifier according to claim 1 or 13, wherein the phosphor layer of the output screen is vacuum-deposited.

* * * * *